US010942252B2

(12) United States Patent
Chen et al.

(10) Patent No.: US 10,942,252 B2
(45) Date of Patent: Mar. 9, 2021

(54) TRACKING SYSTEM AND TRACKING METHOD (71) Applicant: HTC Corporation, Taoyuan (TW)

(72) Inventors: Yuan-Tung Chen, Taoyuan (TW); Kun-Chun Tsai, Taoyuan (TW)

(73) Assignee: HTC Corporation, Taoyuan (TW)

( * ) Notice: Subject to any disclaimer, the term of this patent is extended or adjusted under 35 U.S.C. 154(b) by 414 days.

(21) Appl. No.: 15/853,986

(22) Filed: Dec. 26, 2017

(65) Prior Publication Data

US 2018/0180712 A1    Jun. 28, 2018

Related U.S. Application Data (60) Provisional application No. 62/439,063, filed on Dec. 26, 2016.

(51) Int. Cl.
*G01S 3/80* (2006.01)
*G01S 5/30* (2006.01)
(Continued)

(52) U.S. Cl.
CPC .............. *G01S 5/30* (2013.01); *A63F 13/211* (2014.09); *A63F 13/212* (2014.09);
(Continued)

(58) Field of Classification Search
None
See application file for complete search history.

(56) References Cited

U.S. PATENT DOCUMENTS 5,144,594 A * 9/1992 Gilchrist ............... G06F 3/0346
178/18.04
5,645,077 A * 7/1997 Foxlin .................. A61B 5/1114
600/587
(Continued)

FOREIGN PATENT DOCUMENTS

CN      1308505 A     8/2001
EP      2040035 A1    3/2009
(Continued)

OTHER PUBLICATIONS

Corresponding extended European search report dated May 23, 2018.
(Continued)

*Primary Examiner* — Isam A Alsomiri
*Assistant Examiner* — Jonathan D Armstrong
(74) *Attorney, Agent, or Firm* — CKC & Partners Co., LLC (57) ABSTRACT A tracking system includes a first device and a second device. The first device includes plural ultrasonic sources and an inertial measurement unit configured to detect inertial data. The second device includes at least one ultrasonic receiver and a processor. The processor is configured to receive the inertial data, estimate an orientation of the first device according to the received inertial data, determine a first ultrasonic transmitter from the ultrasonic transmitters according to the orientation of the first device and a location of the first device, and send an enablement command about the first ultrasonic transmitter to the first device. The enabled transmitter of the ultrasonic transmitters sends ultrasounds according to the enablement command, the at least one ultrasonic receiver is configured to receive the ultrasounds from the first ultrasonic transmitter, and the processor deter-
(Continued)

mines the location of the first device according to the received ultrasounds.

12 Claims, 8 Drawing Sheets

(51) Int. Cl.
*A63F 13/25* (2014.01)
*G06F 3/01* (2006.01)
*A63F 13/5255* (2014.01)
*A63F 13/212* (2014.01)
*A63F 13/211* (2014.01)
*G01S 11/14* (2006.01)
*G01S 5/18* (2006.01)
*A63F 13/213* (2014.01)
*G01P 15/02* (2013.01)
*G02B 27/01* (2006.01)

(52) U.S. Cl.
CPC ............ *A63F 13/213* (2014.09); *A63F 13/25* (2014.09); *A63F 13/5255* (2014.09); *G01P 15/02* (2013.01); *G01S 5/186* (2013.01); *G01S 11/14* (2013.01); *G02B 27/017* (2013.01); *G06F 3/011* (2013.01)

(56) References Cited

U.S. PATENT DOCUMENTS

| | | | | |
|---|---|---|---|---|
| 5,812,257 A * | 9/1998 | Teitel | ................. | G01S 7/06 342/463 |
| 5,850,201 A * | 12/1998 | Lasko-Harvill | ......... | G06F 3/011 345/8 |
| 5,856,844 A * | 1/1999 | Batterman | .............. | G01S 5/163 345/158 |
| 6,094,625 A * | 7/2000 | Ralston | ................... | G06F 3/011 702/150 |
| 6,172,657 B1 * | 1/2001 | Kamakura | ........... | G02B 27/017 345/8 |
| 6,400,374 B2 * | 6/2002 | Lanier | ....................... | G06F 3/14 345/630 |
| 6,720,949 B1 * | 4/2004 | Pryor | ..................... | G16H 50/50 345/158 |
| 6,757,068 B2 * | 6/2004 | Foxlin | .................. | G02B 27/017 356/139.03 |
| 7,034,779 B2 * | 4/2006 | Ebersole, Jr. | .......... | A62B 9/006 345/7 |
| 7,056,216 B2 * | 6/2006 | Ohshima | ................. | G06F 3/011 463/36 |
| 7,301,648 B2 * | 11/2007 | Foxlin | .................. | G02B 27/017 356/620 |
| 7,554,511 B2 * | 6/2009 | Fager | ..................... | A63F 13/10 345/7 |
| 7,602,301 B1 * | 10/2009 | Stirling | ................ | A61B 5/1127 340/573.1 |
| 7,610,558 B2 * | 10/2009 | Morita | .................. | G06T 19/006 463/32 |
| 7,716,008 B2 * | 5/2010 | Ohta | ....................... | A63F 13/10 702/152 |
| 7,774,155 B2 * | 8/2010 | Sato | ........................ | A63F 13/06 702/127 |
| 7,839,417 B2 * | 11/2010 | Ebensberger | ............ | G09B 9/00 345/419 |
| 8,094,090 B2 * | 1/2012 | Fisher | ................ | A63B 24/0006 345/8 |
| 8,179,604 B1 * | 5/2012 | Prada Gomez | .... | G02B 27/0093 345/8 |
| 9,323,055 B2 * | 4/2016 | Baillot | ................ | G02B 27/017 |
| 9,324,229 B2 * | 4/2016 | Baillot | ................ | G08B 25/016 |
| 9,682,320 B2 * | 6/2017 | Mao | ........................ | A63F 13/06 |
| 9,805,512 B1 * | 10/2017 | Katz | ...................... | G06T 19/006 |
| 9,898,091 B2 * | 2/2018 | Bristol | .................... | G06F 1/163 |
| 9,987,554 B2 * | 6/2018 | Stafford | ................ | A63F 13/213 |
| 10,010,788 B2 * | 7/2018 | Huang | .................... | G06F 3/011 |
| 10,073,516 B2 * | 9/2018 | Larsen | ............... | G02B 27/0093 |
| 10,086,282 B2 * | 10/2018 | Mao | ........................ | A63F 13/06 |
| 10,198,866 B2 * | 2/2019 | Bickerstaff | ............. | G06F 3/012 |
| 10,241,573 B2 * | 3/2019 | Mallinson | ............. | A63F 13/213 |
| 10,318,019 B2 * | 6/2019 | Banning | ................ | G06F 3/038 |
| 10,352,853 B2 * | 7/2019 | Shiono | ................. | A61B 5/0077 |
| 2006/0233389 A1 * | 10/2006 | Mao | ....................... | H04R 1/406 381/92 |
| 2006/0264260 A1 * | 11/2006 | Zalewski | ................ | A63F 13/42 463/36 |
| 2006/0274911 A1 * | 12/2006 | Mao | ....................... | A63F 13/215 381/334 |
| 2006/0284792 A1 * | 12/2006 | Foxlin | .................. | G02B 27/017 345/8 |
| 2007/0025562 A1 * | 2/2007 | Zalewski | ............... | H04R 3/005 381/92 |
| 2008/0261693 A1 * | 10/2008 | Zalewski | ............... | A63F 13/424 463/31 |
| 2010/0128568 A1 | 5/2010 | Han et al. | | |
| 2010/0285883 A1 * | 11/2010 | Zalewski | ................ | A63F 13/211 463/39 |
| 2018/0143292 A1 * | 5/2018 | Przybyla | .............. | G01S 11/16 |
| 2019/0187244 A1 * | 6/2019 | Riccardi | .............. | G01C 21/165 |

FOREIGN PATENT DOCUMENTS

| | | | | |
|---|---|---|---|---|
| JP | 2014066529 A | * | 4/2014 | ............ G06F 3/147 |
| WO | 99/53838 A1 | | 10/1999 | |
| WO | 01/80736 A1 | | 11/2001 | |

OTHER PUBLICATIONS

Corresponding Taiwan office action dated Aug. 7, 2018.
Corresponding Chinese office action dated Feb. 6, 2020.

* cited by examiner

TRACKING SYSTEM AND TRACKING METHOD

CROSS-REFERENCE TO RELATED APPLICATION

This application claims priority to U.S. Provisional Application Ser. No. 62/439,063, filed on Dec. 26, 2016, which is herein incorporated by reference.

BACKGROUND

Field of Invention

Present disclosure relates to a tracking system and a tracking method. More particularly, present disclosure relates to a tracking device and a tracking method using ultrasounds.

Description of Related Art

Soundwaves can be used to detect distances. However, when the soundwaves are sent by different sources, it is rather difficult to distinguish the sources of the soundwaves. An approach to solve the problem is to encode the soundwaves. However, it is known that the soundwaves transmitting in the air may pollute each other due to the additive and the subtractive effects.

Apparently, if the sources of the soundwaves cannot be distinguished, it is difficult to tracking devices with soundwaves.

SUMMARY

Aiming to solve aforementioned problems, present disclosure provides a tracking system and a tracking method.

The disclosure provides a tracking system includes a first device and a second device. The first device includes a plurality of ultrasonic transmitters and an inertial measurement unit. The inertial measurement unit is configured to detect inertial data. The second device is communicating with the first device. The second device includes at least one ultrasonic receiver and a processor. The processor is configured to configured to receive the inertial data from the first device, estimate an orientation of the first device according to the received inertial data, determine a first ultrasonic transmitter from the ultrasonic transmitters according to the orientation of the first device and a location of the first device, and send an enablement command about the first ultrasonic transmitter to the first device. The first ultrasonic transmitter of the ultrasonic transmitters on the first device is triggered to send ultrasounds according to the enablement command, the at least one ultrasonic receiver is configured to receive the ultrasounds from the first ultrasonic transmitter, and the processor determines the location of the first device according to the received ultrasounds.

Another aspect of disclosure is to provide a tracking method. The method comprises following steps: detecting, by an inertial measurement unit of a first device, inertial data; receiving, by a processor of a second device, the inertial data from the first device; estimating, by the processor, an orientation of the first device according to the received inertial data; according to the orientation of the first device and a location of the first device, determining, by the processor, a first ultrasonic transmitter from a plurality of ultrasonic transmitters settled on the first device; sending, by the processor, an enablement command about the first ultrasonic transmitter to the first device; sending, by the first ultrasonic transmitter of the ultrasonic transmitters on the first device, ultrasounds according to the enablement command; receiving, by at least one ultrasonic receiver of the second device, the ultrasounds from the first ultrasonic transmitter; and determining, by the processor, the location of the first device according to the received ultrasounds.

It is to be understood that both the foregoing general description and the following detailed description are by examples, and are intended to provide further explanation of the disclosure as claimed.

BRIEF DESCRIPTION OF THE DRAWINGS

Present disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

As used herein, the terms "comprising," "including," "having," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

Figure 1:
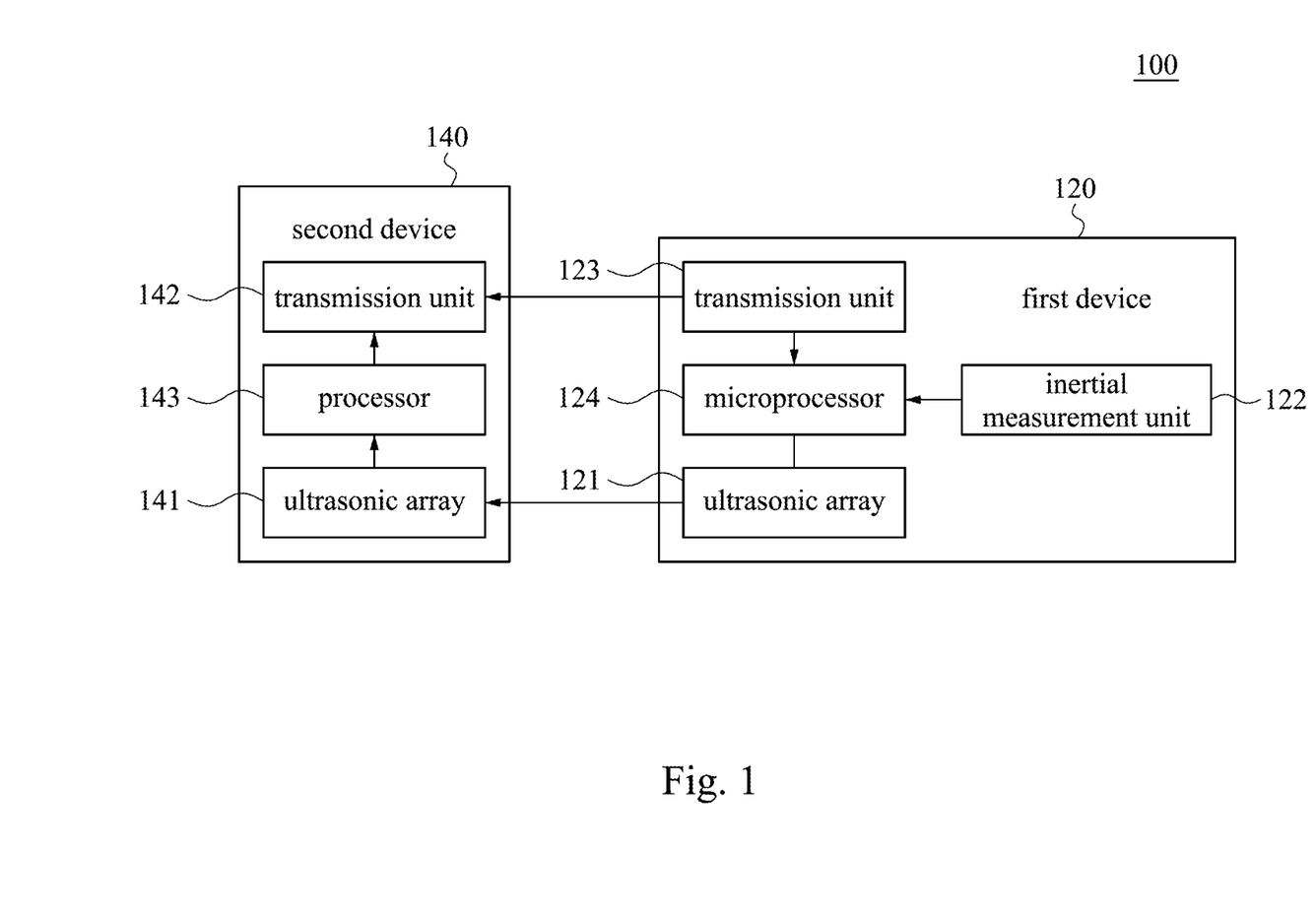
FIG. 1 is a schematic diagram of a tracking system according to one embodiment of present disclosure.

FIG. 1 is a schematic diagram of a tracking system according to one embodiment of present disclosure. In the embodiment, the tracking system 100 is operating in a space, e.g., a room, a chamber, a hall or some outdoor spaces. The tracking system 100 includes a first device 120 and a second device 140. The first device 120 includes an ultrasonic array 121, an inertial measurement unit 122, a transmission unit 123 and a microprocessor 124. The ultrasonic array 121, the inertial measurement unit 122 and the transmission unit 123 are all electrically coupled to the microprocessor 124. The ultrasonic array 121 includes a plurality of ultrasonic transmitters (not shown), which are basically disposed facing different orientations of the first device 120. It is noted, the ultrasonic transmitters of the ultrasonic array 121 are configured to send ultrasounds toward said different orientations, respectively.

In the embodiment, the inertial measurement unit 122 is a device comprises gyros and accelerometers configured to detect angular accelerations and accelerations along at least six axes from the first device 120. The inertial measurement unit 122 can detect inertial data of the first device 120 when the first device 120 is moving or rotating. In the embodiment, the transmission unit 123 of the first device 120 can be, for example, a radio frequency transmitter or an optical transmitter. The transmission unit 123 is configured to send signals to the second device 140 or receive signals from the second device 140 and extract information from the received signals.

In the embodiment, the microprocessor 124 can be, for instance, a CPU or a GPU configured to fetch instructions from a memory and to execute these instructions. By executing some of these instructions, the microprocessor 124 can control the ultrasonic array 121, in specific, the ultrasonic transmitters of the ultrasonic array 121, to send out ultrasounds in a plurality of time divided periods based. It is noted, a single time divided period is a basic time unit that each of the ultrasonic transmitters is able to send the ultrasound. For example, the microprocessor 124 can control the ultrasonic array 121 to broadcast the ultrasounds.

In the embodiment, by executing some of these instructions, the microprocessor 124 of the first device 120 can further retrieve, from the transmission unit 123, the information extracted from the signals sent by the second device 140. Moreover, by executing some of these instructions, the microprocessor 124 can further retrieve the inertial data of the first device 120 from the inertial measurement unit 122 and send the inertial data to the second device 140 via the transmission unit 123.

As shown in FIG. 1, the second device 140 includes an ultrasonic array 141, a transmission unit 142 and a processor 143. The ultrasonic array 141 and the transmission unit 142 are all electrically coupled to the processor 143. The ultrasonic array 141 includes a plurality of ultrasonic receivers (not shown), which are distributed one at least one surface of the second device 140. The ultrasonic receivers of the ultrasonic array 141 are configured to receive the ultrasounds sent by the ultrasonic transmitters of the ultrasonic array 121 corresponding to the time divided periods. For example, in each time divided period, all the ultrasonic receivers of the ultrasonic array 141 are enabled to receive the ultrasound sent by one of the ultrasonic transmitters of the ultrasonic array 121.

In the embodiment, the transmission unit 142 can be, for example, a radio frequency transmitter or an optical transmitter. The transmission unit 142 of the second device 140 is configured to send signals to or receive signals from the transmission unit 123 of the first device 120. Furthermore, when the signals sent from the transmission unit 123 are received, the transmission unit 123 can extract information from the received signals.

In the embodiment, the processor 143 of the second device 140 can be, for instance, a CPU or a GPU configured to fetch instructions from another memory and to execute these instructions. By executing some of these instructions, the processor 143 can retrieve, from the ultrasonic array 141, the ultrasounds sent by the ultrasonic transmitters of the ultrasonic array 121. The processor 143 can further sample the ultrasounds being received by the ultrasonic array 141. It is noted, through the transmission unit 142 and the transmission unit 123, the processor 143 of the second device 140 is in real-time synchronization with the microprocessor 124 of the first device 120. Therefore, the processor 143 can sample the ultrasounds corresponding to the time divided periods correctly.

Typically, according to the ultrasounds being sampled, the processor 143 can determine the distances between the second device 140 and the first device 120 in a continuous manner. Based on these distances, a location of the first device 120 with respect to the second device 140 can be determined.

However, it is noted, the ultrasonic transmitters of the ultrasonic array 121 are disposed facing different orientations, which means some of the ultrasonic transmitters are inevitably sending ultrasounds toward the orientation that cannot be received by the ultrasonic array 141. In this case, making all the ultrasonic transmitters of the ultrasonic array 121 send the ultrasounds in a sequential manner can introduce a low sample rate for the ultrasounds to be received. Therefore, the processor 143 can determine a specific enabled ultrasonic transmitter from the ultrasonic array 121, and said enabled ultrasonic transmitter should be the ultrasonic transmitter that can send ultrasounds toward the orientation at which the second device 140 is located. In this way, if only the enabled ultrasonic transmitter is triggered to send ultrasounds in the following stage, the sample rate of the received ultrasounds can be improved.

More specifically, in the embodiment, the processor 143 is configured to determine said enabled ultrasonic transmitter based on at least two factors, one is the location of the first device 120, and another is the orientation of the first device 120. As mentioned, the microprocessor 124 of the first device 120 can retrieve the inertial data of the first device 120 from the inertial measurement unit 122, and send the inertial data to the second device 140 via the transmission unit 123. Once the transmission unit 142 of the second device 140 receives the inertial data sent by the transmission unit 123, the inertial data is passed to the processor 143. By executing some instructions, the processor 143 can estimate the orientation of the first device 120 based on the received inertial data. Hence the orientation of the first device 120 is acquired. When the orientation of the first device 120 is acquired, the processor 143 can determine said enabled ultrasonic transmitter based on the location of the first device 120 and the orientation of the first device 120. Then, the processor can generate an enablement command for controlling the enabled ultrasonic transmitter and send the enablement command to the first device 120 via the transmission unit 142.

In some embodiments, except the location of the first device 120 and the orientation of the first device 120, the processor 143 is configured to determine said enabled ultrasonic transmitter further according to the arrangement pattern of the first device 120. It is noted, said arrangement pattern is the arrangement positions of the ultrasonic transmitters on the first device 120. As mentioned, the ultrasonic transmitters of the ultrasonic array 121 are disposed to face different orientations on the first device 120. Therefore, at every moment, there are some of the ultrasonic transmitters are facing the orientation that is pointing away from the second device 140. In this case, if the processor 143 can access the arrangement pattern of the first device 120, the processor can obtain the facing of these ultrasonic transmitters. As such, based on the current orientation and location of the first device 120, and further in view of the arrangement pattern of the first device 120, the processor 143 can determine the most efficient ultrasonic transmitter in current status as the enabled ultrasonic transmitter.

In this case, when the transmission unit 123 of the first device 120 receives the signals encoding with the enablement command, the microprocessor 124 can retrieve the enablement command and control the enabled ultrasonic transmitter in the ultrasonic array 121 to send the ultrasounds in following stage. Afterwards, the processor 143 of the second device 140 can sample the ultrasounds sent by the enabled ultrasonic transmitter of the ultrasonic array 121 accordingly. It is obvious that the sample rate for the processor 143 to sample the received ultrasounds can be improved. The processor 143 will sample the received ultrasounds in the following stage, and the location that the first device 120 relative to the second device 140 can be tracked in a continuous manner.

It is noted, in some embodiments, at the moment the tracking system 100 is initialized, the processor 143 can estimate the orientation of the first device 120 based on the received inertial data, yet the location of the first device 120 remains unknown. In this case, the processor 143 can send a re-localization command to the first device 120 in order to acquire the location of the first device 120. When the re-localization command is passed to the microprocessor 124 of the first device 120, the microprocessor 124 can control all ultrasonic transmitters in the ultrasonic array 121 to send the ultrasounds sequentially according to the re-localization command. More specifically, based on the re-localization command, each of the ultrasonic transmitters in the ultrasonic array 121 is triggered to send one of the ultrasounds one after one along the timeline. In each time the ultrasound is sent, the ultrasonic array 141 can try to receive the ultrasounds. Once the ultrasound is received in one of the time divided periods, the processor 143 can determine the location of the first device 120. Then, in following stages, the processor 143 can send the enablement command to the first device 120 based on the orientation of the first device 120, the location of the first device 120, and the arrangement pattern of the first device 120.

Figure 2:
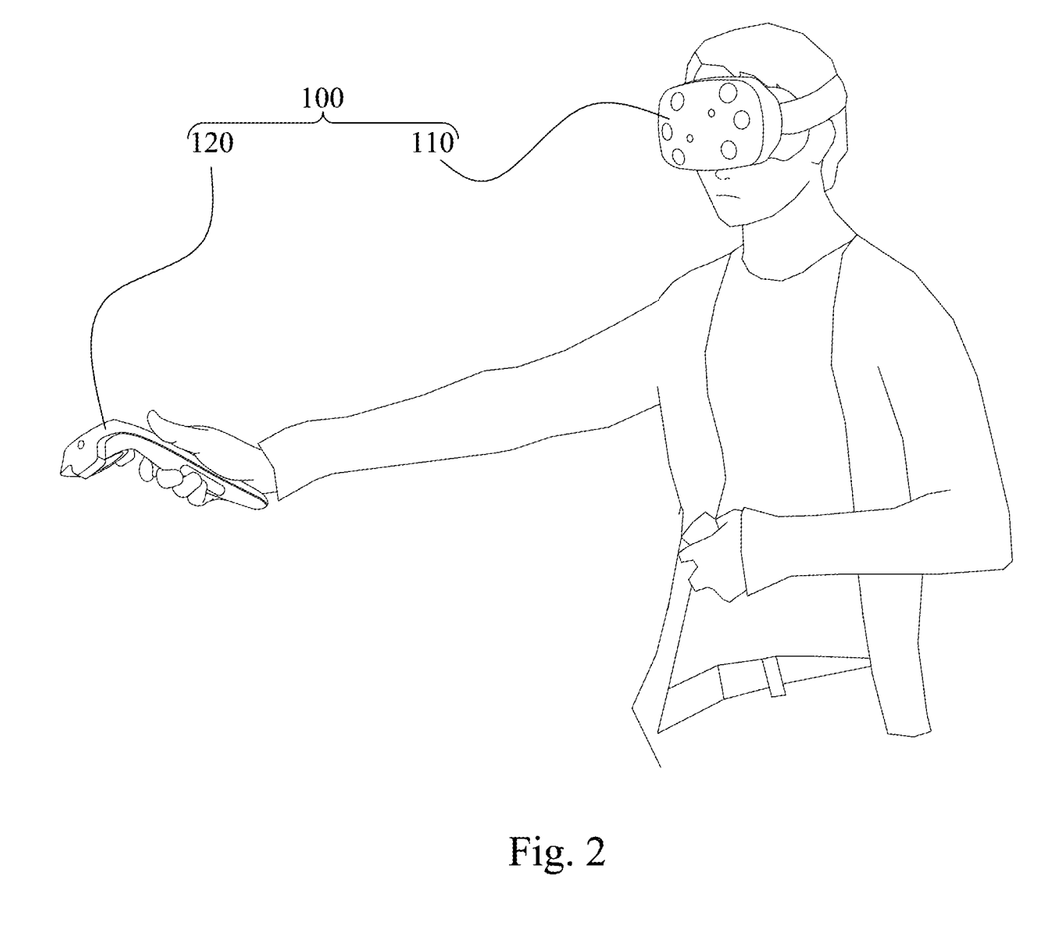
FIG. 2 is a schematic diagram of a tracking system according to one embodiment of present disclosure.

FIG. 2 is a schematic diagram of a tracking system according to one embodiment of present disclosure. As can be seen in the figure, in the embodiment, the first device 120 and the second device 140 of the tracking system 100 in FIG. 1 are both carried by a user. The first device 120, which is a controller, is held by a hand of the user. The second device 140, which is a helmet mounted display device, is worn on the head of the user. In this case, as mentioned in foregoing embodiments, the ultrasonic transmitters of the ultrasonic array 121 can send the ultrasounds in the time divided periods based specific order, and the processor 143 of the second device 140 can sample the received ultrasounds.

Figure 3A:
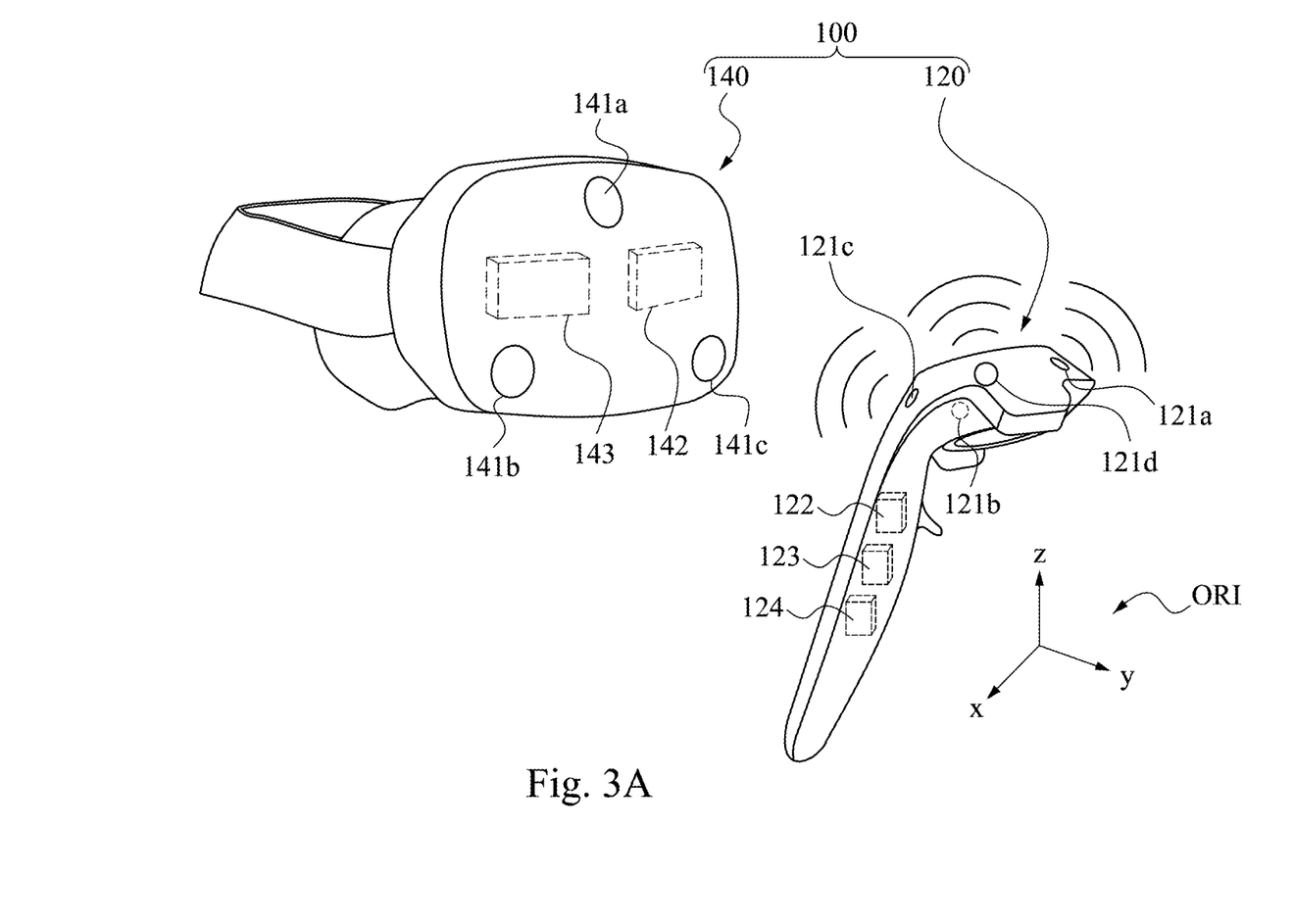
FIG. 3A is a schematic diagram of a tracking system according to one embodiment of present disclosure.

FIG. 3A is a schematic diagram of a tracking system according to one embodiment of present disclosure. It is noted, for ease of understanding, only the first device 120 and the second device 140 of the tracking system 100 in foregoing embodiments are illustrated in FIG. 3, the presence of the user is removed from the figure. However, although it is not shown in the figure, it should be understood that the first device 120 and the second device 140 are currently carried by the user in the embodiment. In FIG. 3A, three ultrasonic receivers of the ultrasonic array 141 are disposed on a front end of the second device 140, which are a first ultrasonic receiver 141*a*, a second ultrasonic receiver 141*b* and a third ultrasonic receiver 141*c*. The first ultrasonic receiver 141*a* is disposed around the top of the front end of the second device 140. The second ultrasonic receiver 141*b* is disposed around the down-left corner of the front end of the second device 140. The third ultrasonic receiver 141*c* is disposed around the down-right corner of the front end of the second device 140.

Figure 3B:
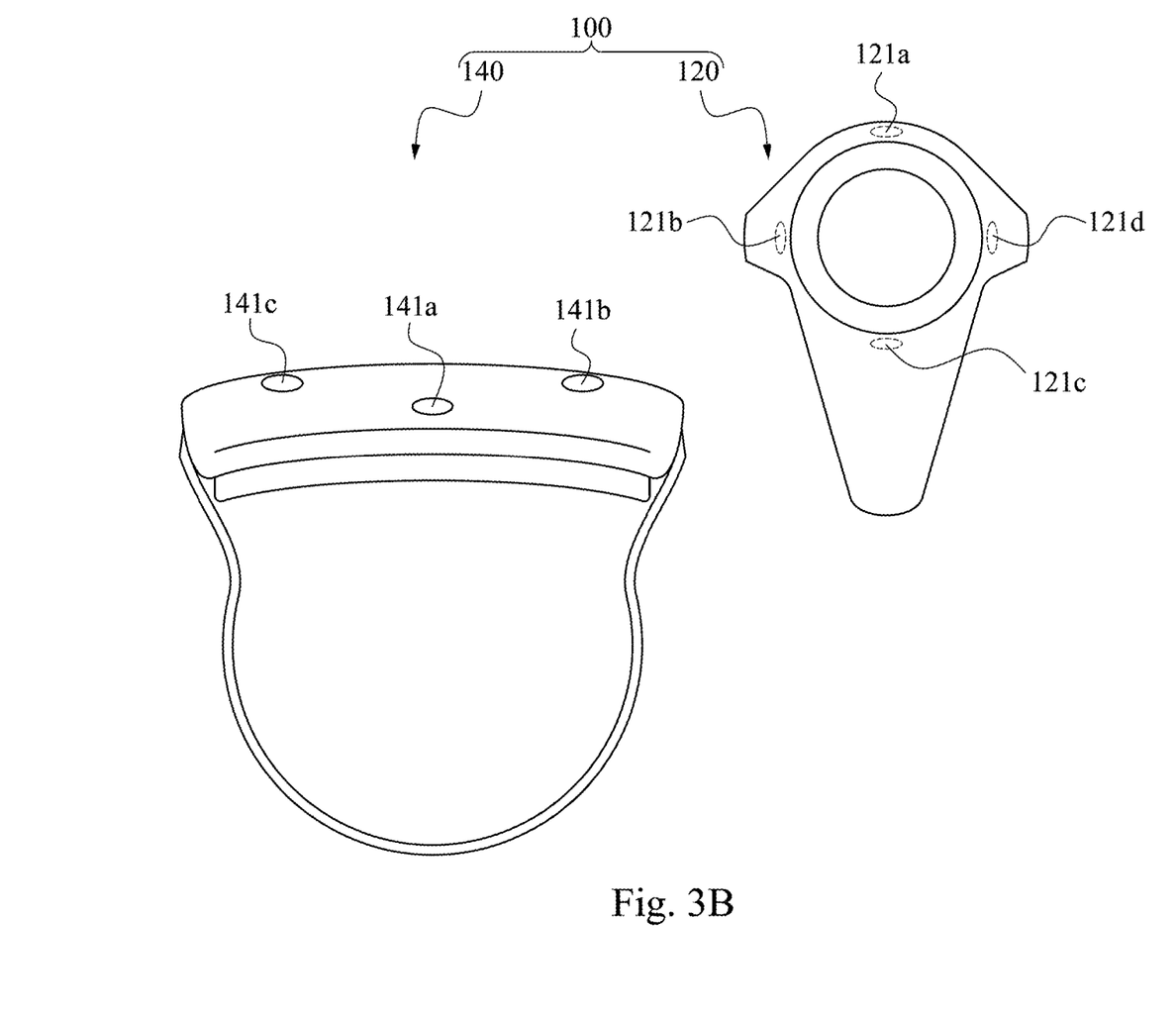
FIG. 3B is a schematic diagram of a top view of the tracking system according to the embodiment of FIG. 3A.

In the embodiment, four ultrasonic transmitters of the ultrasonic array 121 are disposed on a head of the first device 120, which are a first ultrasonic transmitter 121*a*, a second ultrasonic transmitter 121*b*, a third ultrasonic transmitter 121*c* and a fourth ultrasonic transmitter 121*d*. Reference is further made to FIG. 3B, which is a top view of the first device 120 and the second device 140 as shown in FIG. 3A. In the embodiment, FIG. 3B illustrates an embodiment of an arrangement pattern of the first ultrasonic transmitter 121*a*, the second ultrasonic transmitter 121*b*, the third ultrasonic transmitter 121*c* and the fourth ultrasonic transmitter 121*d*. As can be seen in FIG. 3B, the first ultrasonic transmitter 121*a*, disposed on the front end of the head of the first device 120, is configured to send the ultrasounds toward a first orientation (toward a top side in FIG. 3B). The second ultrasonic transmitter 121*b*, disposed on the left lateral of the head of the first device 120, is configured to send the ultrasounds toward a second orientation (toward to a left side in FIG. 3B). The third ultrasonic transmitter 121*c*, disposed on the back end of the head of the first device 120, is configured to send the ultrasounds toward a third orientation (toward to a down side in FIG. 3B). The fourth ultrasonic transmitter 121*d*, disposed on the right lateral of the head of the first device 120, is configured to send the ultrasounds toward a fourth orientation (toward to a down side in FIG. 3B). As mentioned, the ultrasonic transmitters 121*a*-121*d* in the ultrasonic array 121 are configured to send ultrasounds in the time divided periods based on specific orders. It is noted, in this embodiment, distributions and emitting directions of the ultrasonic transmitters 121*a*-121*d* are arranged in aforesaid arrangement pattern (as shown in FIG. 3A and FIG. 3B), and the arrangement pattern are stored in the hardware structure information that can be accessed by the processor 143 of the second device 140.

Figure 4:
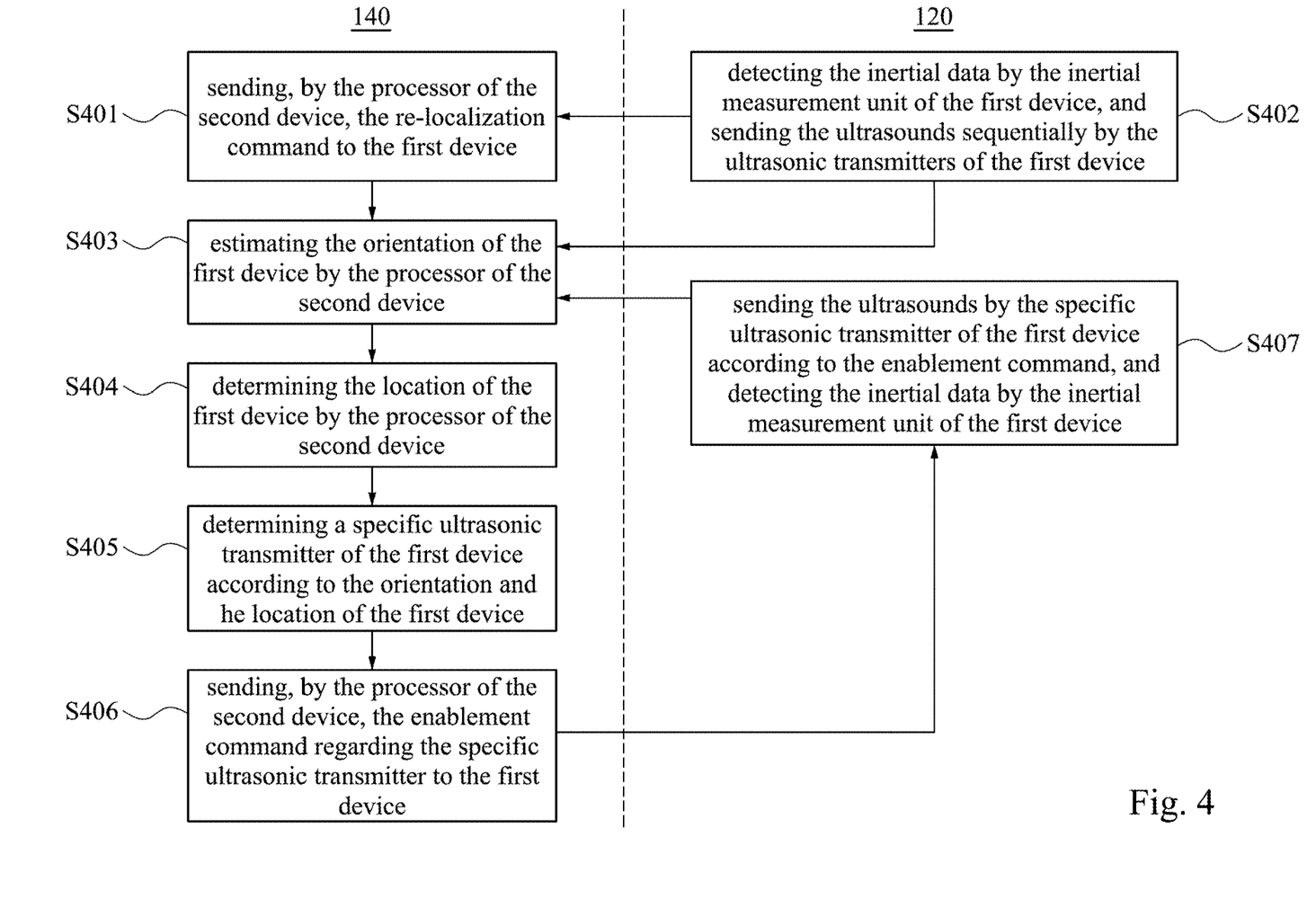
FIG. 4 is a flow chart of a tracking method according to some embodiments of present disclosure.

Reference is further made to FIG. 4. The FIG. 4 is a flow chart of a tracking method according to some embodiments of present disclosure. In the embodiment, the tracking method is executed by the tracking system 100 mentioned in all foregoing embodiments, the references to the embodiments are herein incorporated. In the embodiment, the steps of the tracking method will be listed and explained in detail in following segments.

Step S401: sending, by the processor of the second device, the re-localization command to the first device. As mentioned, in the embodiment, when the tracking system 100 is initiated, in order to acquire the location of the first device 120, the processor 143 of the second device 140 can generate the re-localization command and send the re-localization command to the first device 120 via the transmission unit 142.

Figure 5:
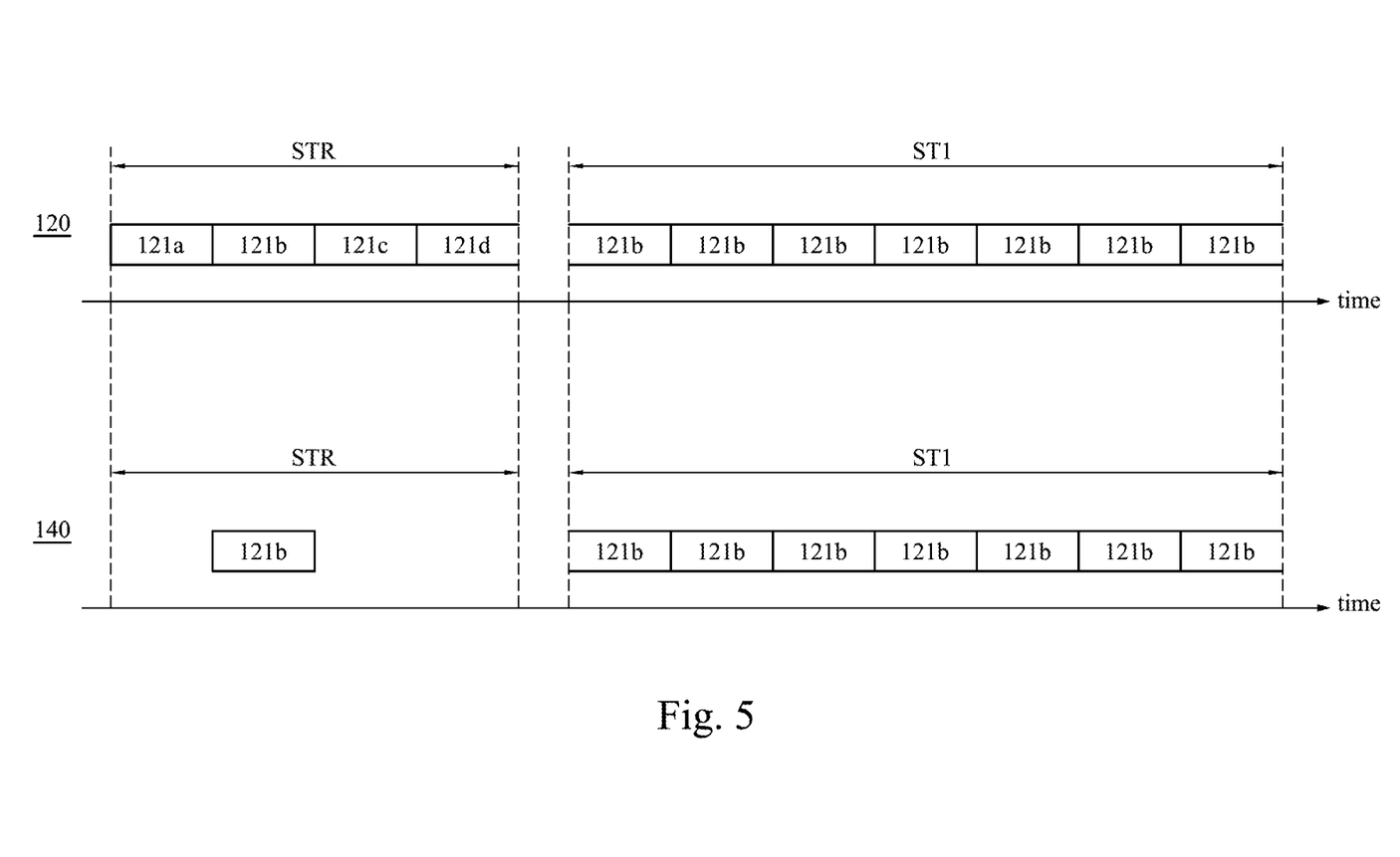
FIG. 5 is a schematic diagram of a system timeline of the tracking system according to one embodiment of present disclosure.

Step S402: detecting the inertial data by the inertial measurement unit of the first device, and sending the ultrasounds sequentially by the ultrasonic transmitters of the first device. As shown in FIG. 3A and FIG. 3B, when the re-localization command is received by the transmission unit 123, the re-localization command is passed to the microprocessor 124. Based on the re-localization command, the microprocessor 124 controls the ultrasonic transmitters 121*a*-121*d* to send ultrasounds in a sequential manner. For ease of understanding, the reference can be made to FIG. 5, which is a timeline of ultrasounds emitting from the first device 120 and received by the second device 140 in the tracking system 100 according to one embodiment of present disclosure. In FIG. 5, the timeline figure illustrated at the top side shows that the ultrasonic array 121 of the first device 120 sends the ultrasounds sequentially in the re-localization stage STR. As shown in the figure, each of the ultrasonic transmitters 121a-121d is enabled to send the ultrasounds, one after another. As shown in FIG. 5, the first ultrasonic transmitter 121a is the first one being enabled to send the ultrasound in the re-localization stage STR, the second ultrasonic transmitter 121b is the second ultrasonic transmitter being enabled to send the ultrasound in the re-localization stage STR, the third ultrasonic transmitter 121c is the third ultrasonic transmitter being enabled to send the ultrasound in the re-localization stage STR, and the fourth ultrasonic transmitter 121d is the fourth ultrasonic transmitter being enabled to send the ultrasound in the re-localization stage STR.

At the meantime, the inertial measurement unit 122 of the first device 120 is configured to detect the inertial data of the first device 120. As mentioned, the inertial measurement unit 122 includes gyros and accelerometers configured to detect angular accelerations and accelerations along at least six axes from the first device 120. The inertial measurement unit 122 can detect the inertial data of the first device 120 based on the movement of the first device 120. Moreover, the reference can be made to FIG. 3A. As shown in FIG. 3A, the inertial data basically include information regarding the orientation ORI of the first device 120. As mentioned in foregoing embodiments, the microprocessor 124 can retrieve the inertial data and send the inertial data to the second device 140, via the transmission unit 123.

Step S403: estimating the orientation of the first device by the processor of the second device. In the embodiment, when the inertial data is received by the transmission unit 142 of the second device 140, the inertial data is passed to the processor 143. Based on the received inertial data, the processor 143 can estimate the orientation ORI of the first device 120.

Step S404: determining the location of the first device by the processor of the second device. In the embodiment, as shown in FIG. 5, in the re-localization stage STR, the ultrasonic transmitters 121a-121d are triggered to send the ultrasounds in a sequential manner, one after another. Correspondingly, in the re-localization stage STR, each of the ultrasonic receivers 141a-141c on the second device 140 tries to receive the ultrasounds sent by the ultrasonic transmitters 121a-121d.

As shown in FIG. 3A and FIG. 3B, the second ultrasonic transmitter 121b is disposed to send the ultrasounds toward the second device 140, and the first ultrasonic transmitter 121a, the third ultrasonic transmitter 121c and the fourth ultrasonic transmitter 121d are disposed to send the ultrasounds toward the directions away from the second device 140. Therefore, the ultrasonic receivers 141a-141c may clearly detect the ultrasounds emitted by the second ultrasonic transmitter 121b. On the other hand, the ultrasonic receivers 141a-141c may not be able to sense the ultrasounds emitted by the first ultrasonic transmitter 121a, the third ultrasonic transmitter 121c and the fourth ultrasonic transmitter 121d (as shown in FIG. 5), because strength of the ultrasounds are decayed or reduced to be undetectable over a relatively longer travel distance.

The timeline figure illustrated at the down side of FIG. 5 shows that none of the ultrasonic receivers 141a-141c receives the ultrasound when the first ultrasonic transmitter 121a, the third ultrasonic transmitter 121c and the fourth ultrasonic transmitter 121d are sending the ultrasound in the re-localization stage STR. It can be seen in the figure, the ultrasonic receivers 141a-141c can only receive the ultrasound emitted by the second ultrasonic transmitter 121b in the re-localization stage STR successfully.

As mentioned, when the ultrasonic receivers 141a-141c receive the ultrasound emitted by the second ultrasonic transmitter 121b, the received ultrasound is passed to the processor 143. In this case, the processor 143 can obtain the distance between the first device 120 and the second device 140 according to the received ultrasound. In this case, the location of the first device 120 can be determined by the processor 143.

Step S405: determining a specific ultrasonic transmitter of the first device according to the orientation and the location of the first device. As mentioned, after the re-localization stage STR, the orientation ORI of the first device 120 and the location of the first device 120 are both obtained by the processor 143 of the second device 140. Further according to the arrangement pattern of the first device 120 (which indicates the arrangement pattern of the ultrasonic transmitters 121a-121d being configured on the first device 120), the processor 143 can determine the second ultrasonic transmitter 121b, which is the ultrasonic transmitter facing the second device 140, as the enabled ultrasonic transmitter.

Step S406: sending, by the processor of the second device, the enablement command regarding the specific ultrasonic transmitter to the first device. As mentioned, when the enabled ultrasonic transmitter (which is the second ultrasonic transmitter 121b) is determined, processor 143 of the first device 120 can generate the enablement command regarding the second ultrasonic transmitter 121b. Afterwards, the processor 143 can send the enablement command regarding the second ultrasonic transmitter 121b to the first device 120, via the transmission unit 142.

Step S407: sending the ultrasounds by the specific ultrasonic transmitter of the first device according to the enablement command, and detecting the inertial data by the inertial measurement unit of the first device. In the embodiment, when the enablement command is received by the transmission unit 123, the enablement command is passed to the microprocessor 124. According to the enablement command, in first stage ST1 following the re-localization stage STR, the microprocessor 124 controls that only the second ultrasonic transmitter 121b is enabled to send ultrasounds in a sequential manner, just as shown in FIG. 5.

As a result, it can be seen in FIG. 5 that all the ultrasounds sent by the second ultrasonic transmitter 121b are successfully received by the ultrasonic receivers 141a-141c in the first stage ST1. Therefore, the sample rate that the processor 143 samples the ultrasounds in the first stage ST1 is significantly increased.

Moreover, in some embodiments, the processor 143 can predict a potential movement of the first device 120 according to at least one of the location and the orientation of the first device over time. As mentioned, by keep obtaining the inertial data of the first device 120 and receiving the ultrasounds sent by the first device 120, the processor 143 can predict the potential movement. In this case, not only the location, the orientation, the arrangement pattern, the processor 143 further determines the enabled ultrasonic transmitter from the ultrasonic transmitters 121a-121d further according to the potential movement.

Figure 6:
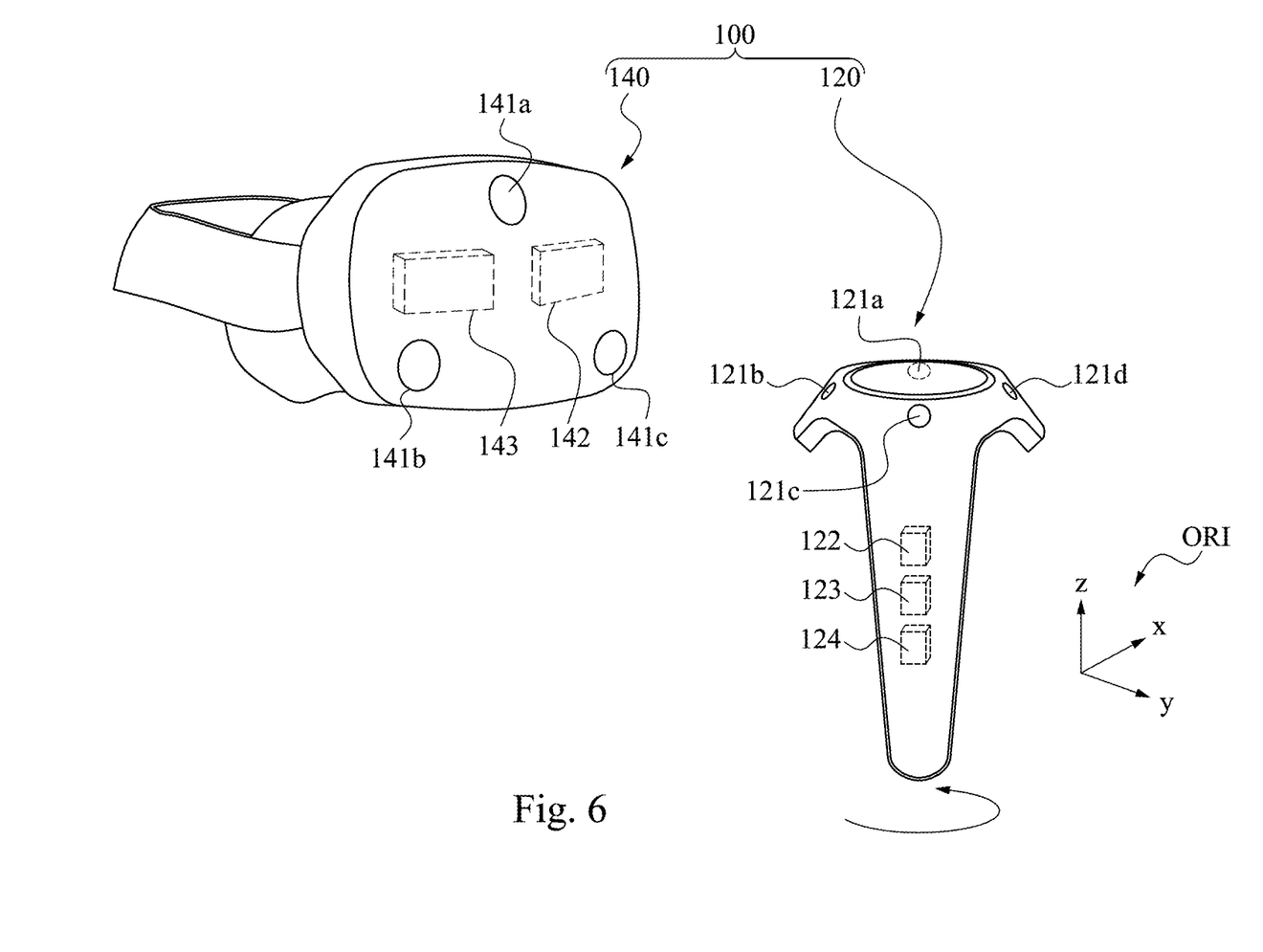
FIG. 6 is a schematic diagram of the tracking system according to the embodiment of FIG. 3A and FIG. 3B.

FIG. 6 is a schematic diagram illustrating that the first device 120 in the tracking system 100 has been moved in an embodiment. Compared to aforesaid embodiment shown in FIG. 3A and FIG. 3B, the first device 120 shown in FIG. 6 has been rotated counterclockwise. Since the first device 120 is rotated, the ultrasonic transmitters 121a-121d in FIG. 6 are located in different positions relative to the embodiment shown in FIG. 3A and FIG. 3B.

As mentioned, the first device 120 is configured with the inertial measurement unit 122. When the first device 120 is moving, the inertial measurement unit 122 detects the orientation data of the first device 120. As can be seen in the FIG. 6, the first device 120 is rotated counterclockwise along the gravity picks axis. Therefore, the orientation data regarding the counterclockwise rotation is detected and sent to the microprocessor 124. The microprocessor 124 then sends the orientation data to the second device 140 via the transmission unit 123. The processor 143 of the second device 140 can retrieve the orientation data via the transmission unit 142.

As mentioned, in the embodiment, the information regarding the arrangement pattern of the ultrasonic transmitters 121a-121d (as shown in FIG. 3B) can be accessed by the processor 143. Based on the orientation data of the first device 120, the processor 143 can estimate the orientation ORI of the first device 120 is changed, so does the facing of the ultrasonic transmitters 121a-121d. In this case, the ultrasonic transmitter facing the second device 140 is no longer the second ultrasonic transmitter 121b. The first ultrasonic transmitter 121a becomes the ultrasonic transmitter facing the second device 140. It this case, based on the orientation ORI of the first device 120 and the location of the first device 120 (which has already acquired when the ultrasound from the second ultrasonic transmitter 121prob is received), the processor can determine the first ultrasonic transmitter 121a as the enabled ultrasonic transmitter. When the enablement command regarding the first ultrasonic transmitter 121a is sent to the first device 120, the microprocessor 124 can control the first ultrasonic transmitter 121a to send ultrasounds in following stage.

Figure 7:
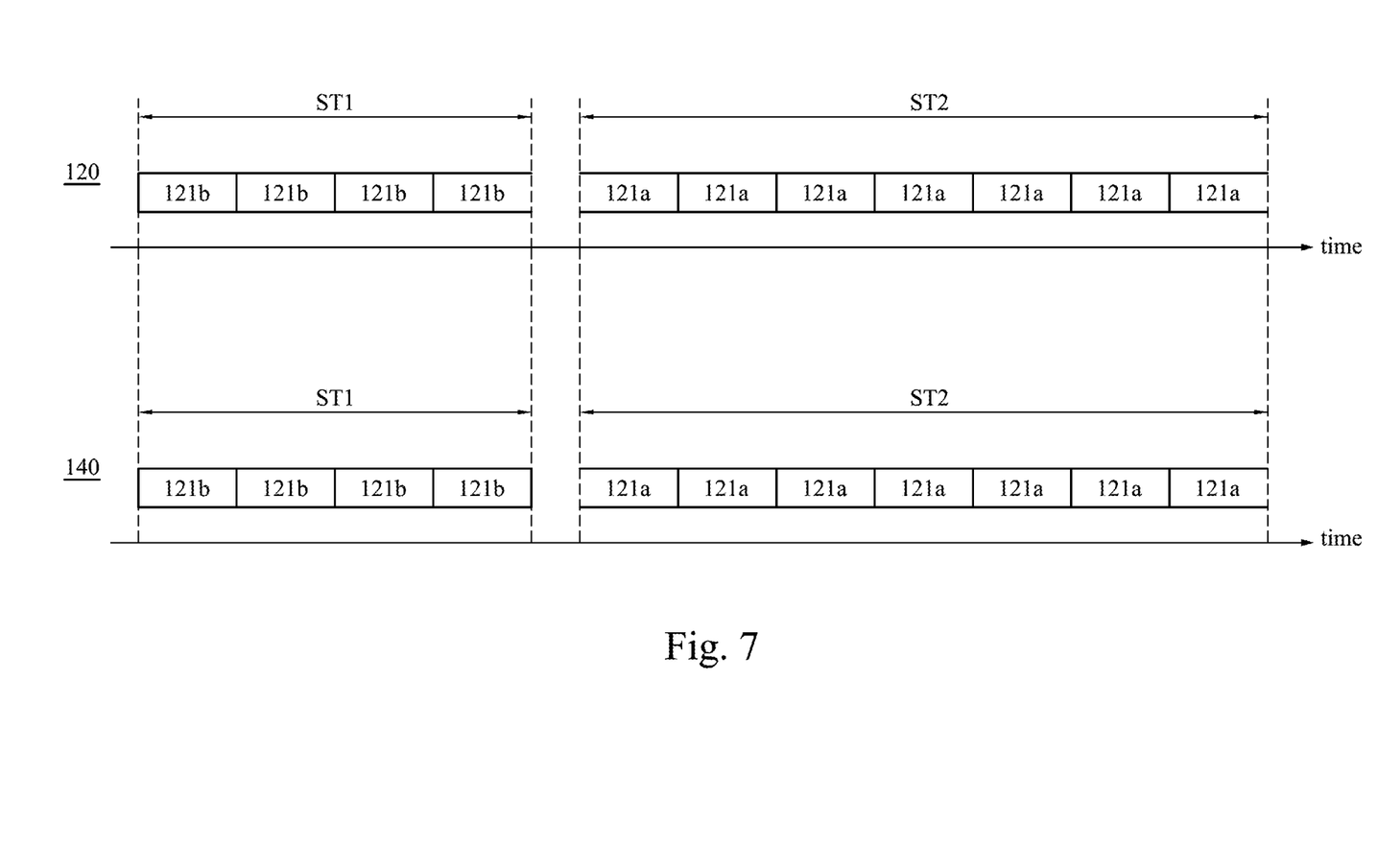
FIG. 7 is a schematic diagram of a system timeline of the tracking system according to one embodiment of present disclosure.

For ease of understanding, the reference can be made to FIG. 7, which is also a schematic diagram of a system timeline of the tracking system 100 according to one embodiment of present disclosure. In FIG. 7, the timeline figure shows the first ultrasonic transmitter 121a became the only ultrasonic transmitter being enabled to send ultrasounds in the second stage ST2 following the first stage ST1. Correspondingly, in the second stage ST2, all the ultrasounds sent by the first ultrasonic transmitter 121a can be received by the ultrasonic receivers 141a-141c of the second device 140. Therefore, the sample rate that the processor 143 samples the ultrasounds in the second stage ST2 can be maintained.

As described above, the tracking device can be used to measure distance between the first device and the second device. However, since the first device can be the controller, the positions that the first device relative to the second device will be changing. In some relative positions, ultrasounds sent from some of the ultrasonic transmitters cannot be received, and in this case, the sample rate that the processor 143 samples the received ultrasounds will be low. As such, present disclosure provides an approach to determine specific enabled ultrasonic transmitter for the ultrasonic transmitters. Through this approach, the sample rate can be increased.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A tracking system, comprising:
a first device, comprising:
    a plurality of ultrasonic transmitters; and
    an inertial measurement unit, configured to detect inertial data; and
a second device, communicating with the first device, the second device comprising:
    at least one ultrasonic receiver; and
    a processor, configured to receive the inertial data from the first device, estimate an orientation of the first device according to the received inertial data, determine a first ultrasonic transmitter facing the second device as an enabled ultrasonic transmitter from the ultrasonic transmitters according to the orientation of the first device and a location of the first device, and send an enablement command about the enabled ultrasonic transmitter to the first device,
    wherein the enabled ultrasonic transmitter is triggered to send ultrasounds according to the enablement command, all the ultrasonic transmitters except for the enabled ultrasonic transmitter are not triggered to send ultrasounds, the at least one ultrasonic receiver is configured to receive the ultrasounds from the enabled ultrasonic transmitter, and the processor determines the location of the first device according to the received ultrasounds from the enabled ultrasonic transmitter;
    wherein the enabled ultrasonic transmitter is changed from the first ultrasonic transmitter to a second ultrasonic transmitter of the ultrasonic transmitters, when the processor determines that the first ultrasonic transmitter no longer faces the second device and the second ultrasonic transmitter faces the second device.

2. The tracking system of claim 1, wherein the ultrasonic transmitters are distributed on different positions on the first device in accordance with an arrangement pattern, the arrangement pattern is stored in the second device, and the processor of the second device determines the first ultrasonic transmitter as the enabled ultrasonic transmitter further according to the arrangement pattern.

3. The tracking system of claim 1, wherein before the location of the first device is acquired by the processor, the processor sends a re-localization command to the first device, and all the ultrasonic transmitters are triggered to send ultrasounds sequentially according to the re-localization command.

4. The tracking system of claim 3, wherein according to the re-localization command, each one of all the ultrasonic transmitters are sequentially triggered to send one of the ultrasounds in one of plural time divided periods within a cycle.

5. The tracking system of claim 4, wherein according to the enablement command, the enabled ultrasonic transmitter is triggered to send the ultrasounds in all time divided periods within the cycle.

6. The tracking system of claim 1, wherein the processor predicts a potential movement of the first device according to at least one of the location and the orientation of the first device over time, and the processor determines the first ultrasonic transmitter as the enabled ultrasonic transmitter from the ultrasonic transmitters further according to the potential movement.

7. A tracking method, comprising:
   detecting, by an inertial measurement unit of a first device, inertial data;
   receiving, by a processor of a second device, the inertial data from the first device;
   estimating, by the processor, an orientation of the first device according to the received inertial data;
   according to the orientation of the first device and a location of the first device, determining, by the processor, a first ultrasonic transmitter facing the second device as an enabled ultrasonic transmitter from a plurality of ultrasonic transmitters settled on the first device;
   sending, by the processor, an enablement command about the enabled ultrasonic transmitter to the first device;
   sending, by the enabled ultrasonic transmitter, ultrasounds according to the enablement command, wherein all the ultrasonic transmitters except for the enabled ultrasonic transmitter are not triggered to send ultrasounds;
   receiving, by at least one ultrasonic receiver of the second device, the ultrasounds from the enabled ultrasonic transmitter; and
   determining, by the processor, the location of the first device according to the received ultrasounds from the enabled ultrasonic transmitter;
   wherein the enabled ultrasonic transmitter is changed from the first ultrasonic transmitter to a second ultrasonic transmitter of the ultrasonic transmitters, when the processor determines that the first ultrasonic transmitter no longer faces the second device and the second ultrasonic transmitter faces the second device.

8. The tracking method of claim 7, wherein the ultrasonic transmitters are distributed on different positions on the first device in an arrangement pattern, and the first ultrasonic transmitter is determined as the enabled ultrasonic transmitter further according to the arrangement pattern.

9. The tracking method of claim 7, further comprising:
   before the location of the first device is acquired, sending a re-localization command to the first device by the processor; and
   sending, by all the ultrasonic transmitters, ultrasounds sequentially according to the re-localization command.

10. The tracking method of claim 9, further comprising:
    according to the re-localization command, sequentially sending, by each one of all the ultrasonic transmitters, the ultrasounds in one of plural time divided periods within a cycle.

11. The tracking method of claim 10, further comprising:
    according to the enablement command, sending, by the enabled ultrasonic transmitter, the ultrasounds in all time divided periods within the cycle.

12. The tracking method of claim 7, further comprising:
    predicting, by the processor of the second device, a potential movement of the first device according to at least one of the location and the orientation of the first device over time; and
    determining, by the processor of the second device, the first ultrasonic transmitter as the enabled ultrasonic transmitter from the ultrasonic transmitters further according to the potential movement.

* * * * *